B. L. STOWE.
APPARATUS FOR MAKING PNEUMATIC TIRES.
APPLICATION FILED NOV. 25, 1916.
1,321,404.
Patented Nov. 11, 1919.
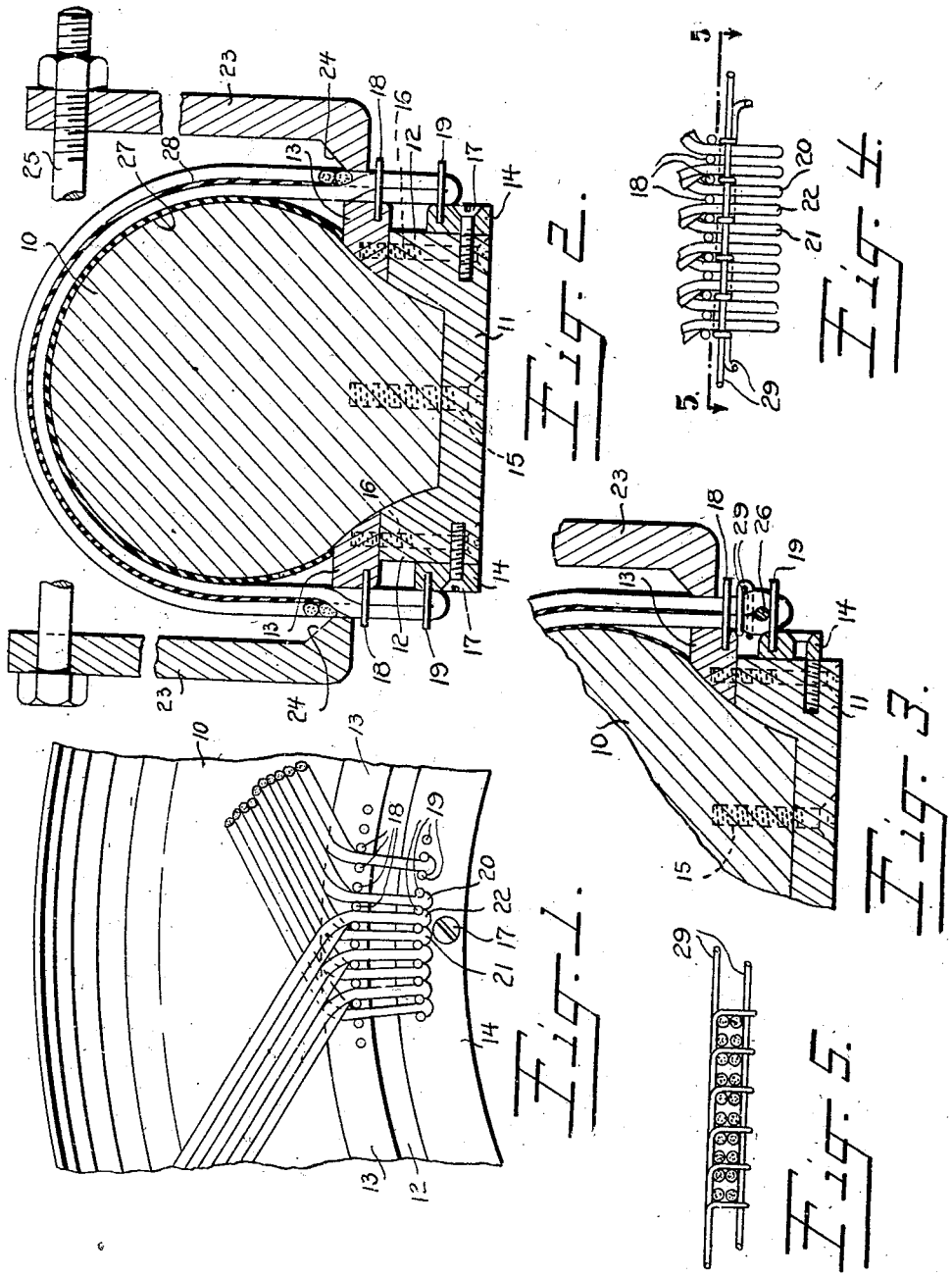
Attest:
S. G. Taylor
by
Inventor:
Benjamin L. Stowe,
Ernest Hopkinson
his Atty

UNITED STATES PATENT OFFICE.

BENJAMIN L. STOWE, OF JERSEY CITY, NEW JERSEY, ASSIGNOR TO MORGAN & WRIGHT, A CORPORATION OF MICHIGAN.

APPARATUS FOR MAKING PNEUMATIC TIRES.

1,321,404.    Specification of Letters Patent.    Patented Nov. 11, 1919.

Application filed November 25, 1916.   Serial No. 133,303.

*To all whom it may concern:*

Be it known that I, BENJAMIN L. STOWE, a citizen of the United States, residing in Jersey City, county of Hudson, and State of New Jersey, have invented certain new and useful Improvements in Apparatus for Making Pneumatic Tires, of which the following is a full, clear, and exact description.

My invention relates to that class of tires which are known as cord tires. An object is to provide apparatus for producing a cord tire in which cords pass entirely around the bead rings and the cords of one layer pull on the bead rings against those of the contiguous layer so that the cords are securely anchored.

In the manufacture of cord tires it is customary to build the tire from a single length of cord doubled backward and forward upon itself so that it provides a series of lengths of cord extending side by side. In one method the cord is looped around pins carried by a suitable form so that the lengths of cord, or cords as they are called, pass obliquely or diagonally across the form between the pins, the direction of the cords of contiguous layers being reversed. My present invention, by a peculiar arrangement of such pins or their equivalent permits of novel loops being initially formed at the margins of the tire, and being then subsequently readjusted without disturbing the rest of the tire, to receive bead rings in such a manner that the oppositely extending cords of contiguous layers pull against each other upon, and thus positively lock each other to, the bead rings.

The invention can be easily understood from the following description taken in connection with the accompanying drawing in which—

Figure 1 is a fragmentary side elevation of apparatus suitable for constructing my improved tire, showing preliminary strands of the tire in position thereon.

Fig. 2 is a cross-sectional view of the apparatus showing the tire clamped to permit of application of the bead rings.

Fig. 3 is a fragmentary view showing the bead rings applied and a tying device for securing the cords against displacement.

Fig. 4 is a fragmentary view showing the tying device in elevation.

Fig. 5 is a cross-sectional view on the line 5—5 Fig. 4.

An apparatus suitable for use in winding my improved cord tire, in its preferred form, comprises a ring core 10, which is equipped on the inner surface with a ring 11, the same being provided on the opposite sides of the core with flanges 12 to the outer and side face of each of which rings 13 and 14 are attached by screws 16 and 17. All of these rings are formed in sections so that they may be readily removed when desired. Pins 18 project from each outer ring 13 and extend in a direction parallel with the axis of the core, these pins being arranged in a circular series and being equal in number, in the present embodiment, to the number of cords in a single layer. Pins 19 project from each inner ring 14 in a circular series concentric with pins 18, and these pins, in the present embodiment, are also equal in number to the number of cords in a single layer.

One method of constructing the tire will be described. A loop 20 of the cord is passed diagonally across the surface of the core and pressed into the space between two of the outer pins 18, the bight of the loop being then carried to and wedged between two of the pins 19. This is repeated on the opposite side of the core. The next loop 21 of the cord is then brought across the core and pressed into the space between two of the pins 18, but not in the space next adjoining the one the first mentioned loop 20 occupies, but into the space once removed from that space. The loop 21 is then carried to and wedged into the space between two of the pins 19 next adjoining the ones between which the previous loop 20 was wedged. This operation of passing loops across the core, pressing the same into every other space between the pins 18, and wedging them between the pins 19, is performed alternately first on one side of the core and then on the other side of the core, and is continued until a complete layer of diagonally extending cords is formed on the core.

The second layer, having its cord at approximately a right angle to those of the first laid layer, is then begun, the loops 22 of the cord being brought across the core to and passed between the pins 18 as above described, but in this instance the loops are pressed into the spaces between the pins not occupied by the loops of the first laid layer. Thus a loop of cord of the first layer and a loop of cord of the second layer will occupy adjoining spaces between the pins 18 and between the pins 19. More than two layers may be laid if desired, but for the present description the winding will be considered complete when all the cords of the first two layers are laid.

When the winding operation above described is finished, a pair of annular clamps 23 are applied to the tire, these clamps each having a flange 24 that is slightly larger than the outer circle of pins 18. When the clamps are drawn together by clamp bolts 25 the flanges will clamp the cords tightly against the outer rings 13 just outside of the circle of pins 18 and will prevent the cords from drawing back through the pins 18, and loosening upon the core when the pins 19 are displaced by removing the screws 17 as shown in Fig. 3, to permit manipulation of the bights of the loops.

After the rings 14 are loosened, the bights of the loops which now hang loosely below the pins 18 at each margin of the tire are distended, and the bead rings 26, each preferably formed of a continuous length of wire are now applied within the loops. After insertion of both bead rings the clamps 23 are removed, then the rings 11, 13 and 14 are removed as a unit and the pins 18 and 19 withdrawn from the tire. The core may now be removed from the tire if desired, or the tire may be completed and vulcanized on the core before its removal if desired. In the latter event the core will be first treated with rubber 27, before application of the cords thereto, and in any case all desired rubberizing of the cords, or placing of rubber 28 between the layers will be performed at the required stages of the building operation.

It will be noted that by using two concentric circular series of pins 18 and 19, I am enabled to so initially position the loops at the margins of the tire that the two loops, one from each layer, which occupy adjoining spaces between the pins 18 and 19, cross each other outside of the pins 18. This is illustrated by the loops 21 and 22 Fig. 1. The pins 18 temporarily anchor the loops in this crossed relation during manipulation of the bights to receive the bead rings, and during application of the bead rings, so that the rest of the tire beyond this anchorage of the loops is not disturbed and the work already performed in accurately laying the cords upon the core is not impaired. In the product the loops, one from each layer, cross each other near the bead rings, and as they extend in opposite directions from the bead rings, they will pull against each other on the bead rings and positively lock each other thereto.

To positively prevent displacement of the cords I tie the same together preferably just outside of pins 18 by means of looped metal devices 29, preferably applied while the cords are being laid, and the application may be accomplished in any preferred manner. The devices prevent the cords from moving laterally and firmly unite them to each other. The devices, in the present embodiment, I illustrate as binding together one loop of the outer layer and one loop of the inner layer as shown in Figs. 4 and 5, but may equally well bind together the loops of each layer independently of the other layer. Various modifications of the tying devices, such as forming the same of thread stitches, may be resorted to but will not be herein described. While I have described a specific embodiment of the invention, I do not wish to be limited to the exact construction and disclosure since various modifications may be resorted to within the scope of the appended claims without departing from the spirit or sacrificing any of the advantages of the invention.

Having described my invention, what I claim and desire to protect by Letters Patent is:

1. In tire building apparatus, a ring core upon which a cord may be doubled back and forth upon itself to form successive transverse loops with the bights thereof at the edges of the core, means for detachably positioning the bights of the loops at the edges of the core, and means for temporarily anchoring each loop near the bights thereof whereby to permit of subsequent manipulation of the bights of the loops without disturbing the loops beyond said anchoring means.

2. In tire building apparatus, a ring core upon which a cord may be doubled back and forth upon itself to form successive transverse loops with the bights thereof at the edges of the core, devices near the edges of the core upon which the bights of the loops may be fixed and being displaceable to permit of subsequent manipulation of the bights, and means for temporarily anchoring each loop near said devices whereby to permit of said manipulation of the bights of the loops without disturbing the loops beyond said anchoring means.

3. In tire building apparatus, a ring core upon which a cord may be doubled back and forth upon itself to form successive transverse loops with the bights thereof at the edges of the core, means for detachably positioning the bights of the loops at the edges of the core, and devices spaced from the edges of the core and defining spaces into which each loop may be pressed and thereby temporarily anchored whereby to permit of subsequent manipulation of the bights of the loops without disturbing the loops beyond said devices.

4. In tire building apparatus, a ring core upon which a cord may be doubled back and forth upon itself to form successive transverse loops with the bights thereof at the edges of the core, a circular series of pins near each edge of the core upon which the bights of the loops may be detachably fixed, and a circular series of pins on each side of the core concentric with the first named series of pins and defining spaces into which the loops may be pressed and thereby temporarily anchored near the bights thereof during doubling of the cord whereby to permit subsequent manipulation of the bights of the loops without disturbing the loops beyond said anchoring series of pins.

5. In tire building apparatus, a ring core upon which a cord may be doubled back and forth upon itself to form successive transverse loops with the bights thereof at the edges of the core, means for detachably positioning the bights of the loops at the edges of the core, means for temporarily anchoring the loops near the bights thereof during doubling of the cord to permit of subsequent manipulation of the bights of the cord without disturbing the loops beyond said anchoring means, and means for clamping the loops against withdrawal from the anchoring means and loosening during said manipulation of the bights of the loops.

6. In tire building apparatus, a ring core, concentric circular series of pins disposed near each edge of the core, extending parallel with the axis of the core, and means for detachably securing each series to the core independently of the other series including a plurality of rings.

7. In tire building apparatus, a ring core, concentric circular series of pins disposed on the core sides near the edges of the core, and clamps disposed to operate near each outer series of pins.

Signed at Jersey City this sixteenth day of November, 1916.

BENJAMIN L. STOWE.